(12) United States Patent
Claus et al.

(10) Patent No.: US 8,888,377 B2
(45) Date of Patent: Nov. 18, 2014

(54) BEARING MOUNTING ARRANGEMENT FOR A DRIVE TRAIN OF A MOTOR VEHICLE

(75) Inventors: Matthias Claus, Ottenbach (DE); Mohd Azwan Aziz, Kuala Terengganu (MY)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 13/489,104

(22) Filed: Jun. 5, 2012

(65) Prior Publication Data

US 2012/0321236 A1    Dec. 20, 2012

Related U.S. Application Data

(63) Continuation-in-part of application No. PCT/EP2010/005637, filed on Sep. 14, 2010.

(30) Foreign Application Priority Data

Dec. 17, 2009    (DE) .......................... 10 2009 058 560

(51) Int. Cl.

| | |
|---|---|
| F16C 23/00 | (2006.01) |
| F16C 25/08 | (2006.01) |
| F16C 19/54 | (2006.01) |
| F16C 35/063 | (2006.01) |
| F16H 57/021 | (2012.01) |

(52) U.S. Cl.
CPC ............. *F16C 35/063* (2013.01); *F16C 25/08* (2013.01); *F16C 19/54* (2013.01); *F16H 57/021* (2013.01)
USPC ........................................................ 384/563

(58) Field of Classification Search
USPC ......... 384/452–455, 556–558, 445, 494, 563, 384/564, 585, 615, 622, 513; 74/416, 423, 74/424

See application file for complete search history.

(56) References Cited

U.S. PATENT DOCUMENTS

| 1,880,660 | A |   | 10/1932 | Bauroth | |
|---|---|---|---|---|---|
| 2,019,464 | A | * | 10/1935 | Riblet | ............................ 74/424 |
| 2,118,760 | A | * | 5/1938 | Ernst | ............................. 384/455 |
| 3,066,000 | A | * | 11/1962 | James et al. | .................. 384/537 |
| 3,516,717 | A | * | 6/1970 | Peterson | ....................... 384/517 |
| 3,964,806 | A | * | 6/1976 | Harrison | ....................... 384/620 |
| 4,085,984 | A | * | 4/1978 | Cameron | ....................... 384/563 |
| 4,172,621 | A | * | 10/1979 | Yoshida | ......................... 384/563 |
| 4,862,681 | A | * | 9/1989 | Linde et al. | ............... 56/16.4 C |
| 5,009,523 | A | * | 4/1991 | Folger et al. | .................. 384/475 |
| 5,651,617 | A | * | 7/1997 | Danielsson | .................... 384/539 |

(Continued)

FOREIGN PATENT DOCUMENTS

| DE | 10 2005 027082 A1 | 12/2006 |
|---|---|---|
| JP | 05 071454 | 3/1993 |

(Continued)

*Primary Examiner* — Richard W Ridley
*Assistant Examiner* — Brian McGovern
(74) *Attorney, Agent, or Firm* — Klaus J. Bach

(57) ABSTRACT

In a bearing mounting arrangement for a drive train of a motor vehicle including a shaft having a drive part non-rotatably connected to the shaft and at least an outer bearing ring and an inner bearing ring which can be biased by means of a bracing device in axial direction of the shaft toward the outer bearing ring due to a relative rotation of the drive part with respect to the bearing ring with a bearing tensioning force which depends on a torque transmitted by the shaft so that the bearing tensioning force is relatively low during low-torque operation of the drive train.

8 Claims, 3 Drawing Sheets

(56) References Cited

U.S. PATENT DOCUMENTS

| | | | |
|---|---|---|---|
| 6,315,457 B1* | 11/2001 | Kapaan et al. | 384/544 |
| 7,086,983 B2* | 8/2006 | Turner et al. | 475/230 |
| 7,537,390 B2* | 5/2009 | De Boer et al. | 384/504 |
| 2003/0106384 A1* | 6/2003 | Yokota et al. | 74/424 |
| 2008/0298732 A1* | 12/2008 | Gradu et al. | 384/452 |
| 2010/0247016 A1* | 9/2010 | Rivett et al. | 384/563 |
| 2011/0123326 A1* | 5/2011 | DiBenedetto et al. | 415/229 |
| 2012/0070110 A1* | 3/2012 | Owens | 384/563 |

FOREIGN PATENT DOCUMENTS

| | | |
|---|---|---|
| JP | 2003 056662 A | 2/2003 |
| JP | 2005 321004 A | 11/2005 |
| JP | 2006 312973 A | 11/2006 |

* cited by examiner

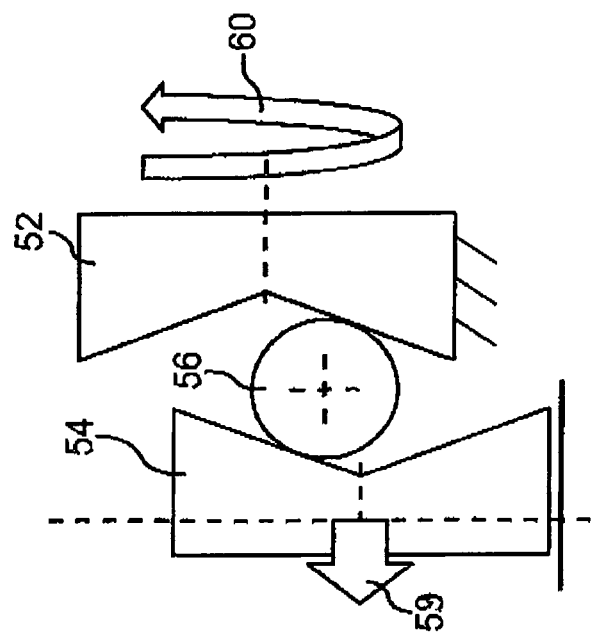
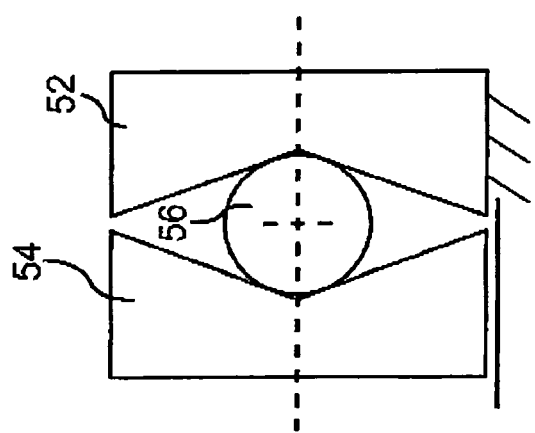

BEARING MOUNTING ARRANGEMENT FOR A DRIVE TRAIN OF A MOTOR VEHICLE

This is a Continuation-In-Part application of pending international patent application PCT/EP2010/005637 filed Sep. 14, 2010 and claiming the priority of German patent application 10 2009 058 560.5 filed Dec. 17, 2009.

BACKGROUND OF THE INVENTION

The invention relates to a bearing mounting arrangement for a drive train of a motor vehicle, including a drive component connected to a shaft and a bearing ring with an arrangement for applying an axial force to the bearing ring.

DE 10 2005 027 082 A1 discloses a mounting device for motor vehicles, with two roller bearings, having outer bearing rings of which are arranged in a housing and inner bearing rings arranged on a shaft, and a tensioning device for axially bracing the outer rings with respect to the inner rings. The tensioning device thereby comprises an intermediate element which facilitates a change in the axial pretensioning of the roller bearings through a load-dependent change of its thickness dimensions. The intermediate element is designed for example as an electrically controllable piezo element.

Such actuators as well as other, for example, mechanical or hydraulic actuating elements, require regulation and auxiliary energies and this increases the complexity as well as the costs in an undesirable manner.

It is the principal object of the present invention to provide a mounting device of the type described above which is less complex and costs less.

SUMMARY OF THE INVENTION

In a bearing mounting arrangement for a drive train of a motor vehicle including a shaft having a drive part non-rotatably connected to the shaft and at least an outer bearing ring and an inner bearing ring which can be biased by means of a bracing device in axial direction of the shaft toward the outer bearing ring due to a relative rotation of the drive part with respect to the bearing ring with a bearing tensioning force which depends on a torque transmitted by the shaft so that the bearing tensioning force is relatively low during low-torque operation of the drive train.

The shaft of the bearing mounting arrangement according to the invention can thereby be driven by the drive part. In dependence upon a torque applied by the drive part to the shaft, a rotation of a region of the shaft takes place, by means of which this torque is applied to the shaft relative to a region of the shaft arranged downstream in the direction of the torque flow, in which the bearing ring of the shaft, which is for example non-rotatably connected to the shaft, is arranged. In other words this means that a shaft element of the shaft is twisted in dependence upon the amount of the torque applied via the drive part to the shaft. This results in a relative rotation, that is a slight twisting, of the drive shaft part with respect to the bearing ring of the shaft depending on the amount of the torque applied. By means of the bracing device as a result of this relative rotation of the drive part with respect to the bearing ring the bearing ring can be subjected to a force in axial direction, whereby an axial tensioning of a bearing which comprises the bearing ring is obtained in accordance with the amount of the torque supplied and applied to the shaft.

The bearing comprises for example not only said bearing ring which is formed for example as a bearing inner ring connected non-rotatably to the shaft but also a corresponding bearing outer ring, wherein the bearing inner ring and the bearing outer ring are supported against each other through bearing bodies, in particular roller bodies such as for example conical rollers. Following the force application to the bearing ring that is the bearing inner ring, the bearing inner ring can be braced relative to the bearing outer ring, whereby an axial tensioning of the bearing is realized in dependence upon the amount of the torque applied.

The bracing device of the mounting arrangement according to the invention thus does not require control of any actuating elements which consume energy. The mounting device according to the invention exhibits not only less complexity, a low number of parts and associated low costs but also a low weight, which is favorable to the energy consumption of the motor vehicle for operation thereof. Furthermore the probability of breakdown of the mounting device according to the invention is extremely low due to the low complexity thereof.

The described relative rotation of the regions of the shaft takes place due to elasticities in the shaft or its shaft element, whereby this effect is used to provide for the advantageous axial tensioning of the bearing.

This torque-dependent bearing tensioning reduces the power losses of the bearing, in particular in low and average torque ranges, whereby this results in a further reduction of the energy requirement for the operation of the motor vehicle. If for example a drive unit of the motor vehicle is an internal combustion engine this results in fuel reduction and a reduction of $CO_2$ emissions. In comparison with known mounting devices a reduction of bearing losses by up to 30% is thus possible, which improves the degree of efficiency of the bearing operation.

Besides the fact that no additional sensors and/or control units are necessary, the mounting device according to the invention has the advantage that it only has a low construction space requirement and also requires only a minimum change of already existing components and can thus be integrated into already existing components and designs virtually without time-consuming and costly modification work. Furthermore subsequent fitting of already existing systems is possible with the mounting arrangement according to the invention.

In an advantageous embodiment of the invention the bracing device comprises at least one control part which is assigned to the drive part and at least in areas is substantially in the form of a ramp and also at least one corresponding actuating part which is assigned to the bearing element and at least in areas is substantially in the form of a ramp, whereby the control part and the actuating part cooperate through at least one intermediary part, in particular a roller body. Advantageously the drive part is integrally formed with the control part and the bearing ring with the actuating part, whereby this keeps the number of parts and thus the costs of the mounting device within limits. The respective ramp form is thereby formed at least substantially parallel to the radial direction. In any case the relative rotation of the shaft or the regions of the shaft and thus the relative rotation of the drive part with respect to the bearing ring Can be implemented through the control part and the actuating part into an axial force impacting the bearing ring of the shaft and thus into an axial movement thereof, whereby the torque-dependent bearing tension in accordance with requirements is thus realized. The roller body, with the aid of which the control part and the actuating part cooperate, is for example in the form of a cylinder roller capable of transmitting high axial forces.

It should be noted at this point that the shaft is mounted for example by means of at least two bearings, both including a described bearing inner ring connected non-rotatably to the shaft and a corresponding bearing outer ring, wherein the bearing outer ring is fixed for example in a housing. These bearings are for example conical roller bearings which are arranged in a known X or O arrangement or in another arrangement. The mounting device according to the invention can be used, however, for any type of roller bearings which are to advantageously transfer axial and radial forces in a play-free manner. For this purpose a bearing tension is generally necessary which, as described, is achieved through the mounting device according to the invention only when needed in a simple manner.

Such a bearing tensioning brings about an optimal use of the bearing load capacity in all operating states, an avoidance of bearing play and tilting of the shaft and also a compensation capability for heat expansions.

The necessary and desirable bearing tension, that is the amount of the force acting in axial direction of the shaft, is normally experimentally determined and usually exactly set by means of spacing washers. The amount of the bearing tension needs to be based on the highest possible load effective on the shaft. This results in an additional bearing load and increases the torque-dependent bearing power losses over the whole spectrum of use. The use of an actuating element, for example in the form of an actuator, for targeted torque-dependent bearing pretension reduces the pretension in the partial load region and improves the degree of efficiency, but has the disadvantages already described.

These remaining disadvantages of such an active actuating member and the disadvantages of the increased bearing power losses over the whole spectrum of use are overcome by the mounting device according to the invention.

The control part is advantageously arranged at an end face of the drive part facing the bearing ring and the actuating part is advantageously arranged on an end face of the bearing ring facing the drive part. This provides for a targeted and direct force transfer and a low construction space requirement of the mounting device according to the invention.

The invention will become more readily apparent from the following description below of a preferred embodiment and by reference to the accompanying drawings.

BRIEF DESCRIPTION OF THE DRAWINGS

FIGS. 3A and 3B are schematic views illustrating the working principle of the bearing mounting arrangement according to the invention.

DESCRIPTION OF A PARTICULAR EMBODIMENT OF THE INVENTION

Figure 1:
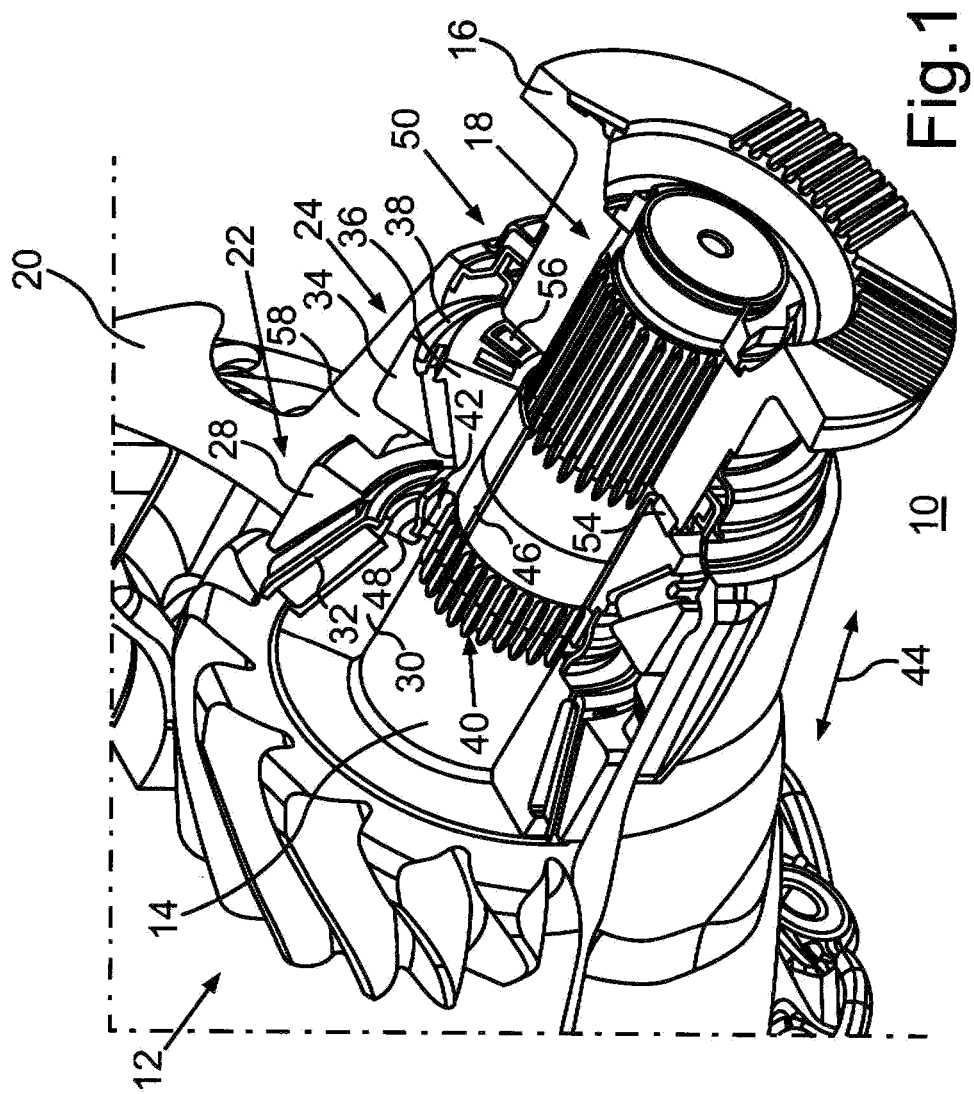
FIG. 1 shows, in a perspective view, an embodiment of the bearing mounting arrangement according to the invention.

FIG. 1 shows a bearing mounting arrangement 10 for a drive train of a utility vehicle with a shaft 14 comprising a drive pinion 12 which is non-rotatably connected to a drive stub in the form of a coupling flange 16. The non-rotatable connection of the shaft 14 to the coupling flange 16 is established via toothing 18, via which during driving of the utility vehicle a torque can be transmitted by an internal combustion engine from the coupling flange 16 to the shaft 14 which then, in turn, drives a rear axle differential gear via its drive pinion 12.

The shaft 14 is mounted in a housing 20 shown partially cut-out, via a first conical roller bearing 22 and via a second conical roller bearing 24, whereby the conical roller bearings 22 and 24 are arranged in an X-arrangement. The coupling flange 16 and the conical roller bearings 22 and 24 are accommodated partially within a mounting structure 10.

The conical roller bearing 22 comprises a bearing outer ring 28 which is fixed non-rotatably in the housing 20 and a bearing inner ring 30 non-rotatably connected to the shaft 14. The bearing outer ring 28 and the bearing inner ring 30 are thereby supported against each other with the aid of roller bodies in the form of conical rollers. The conical roller bearing 22 further comprises a cage 32 which holds the conical rollers in position.

It is similar with the conical roller bearing 24 which also comprises a bearing outer ring 34 fixed non-rotatably in the housing 20 and a bearing inner ring 36 connected non-rotatably to the shaft 14 and roller bodies in the form of conical rollers and a cage 38.

If the bearing inner ring 30 of the conical roller bearing 22 is for example non-rotatably connected to the shaft 14 through a press fit the non-rotatable connection of the bearing inner ring 36 of the conical roller bearing 24 with the shaft 14 is realized via a toothing 40. For the toothing 40 a toothing of the shaft 14 is in engagement with a corresponding toothing of a toothed sleeve 42 which is non-rotatably connected to the bearing inner ring 36, for example by welding. This allows a relative displacement of the bearing inner ring 36 with respect to the shaft 14 in axial direction of the shaft 14 according to a direction arrow 44. A slide bushing 46 is arranged in radial direction of the shaft 14 between the bearing inner ring 36 and the shaft 14, which slide bushing 46 provides for low friction during the relative movement of the bearing inner ring 36 with respect to the shaft 14 and facilitates the movement between the bearing inner ring 36 and the shaft 14. The bearing inner ring 36 is in rotational engagement with the shaft 14 via the toothing 40 so that a torsion twist section is formed between the shaft area 40, where the bearing inner ring 36 is connected for rotation with the shaft and the shaft area where the flange 16 is connected to the shaft 14.

In axial direction of the shaft 14 according to the direction arrow 44 between the bearing inner ring 30 and the bearing inner ring 36 a compression sleeve 48 is also arranged which on the one hand is supported on the bearing inner ring 30 and on the other hand on the bearing inner ring 36 via corresponding stops.

With the mounting arrangement 10 a play-free torque-dependent transfer of axial forces, thus forces in axial direction of the shaft 14 according to the direction arrow 44, is achieved by a bearing tensioning of the mounting device 10 or the conical roller bearings 22 and 24 in axial direction.

It is thereby desirable in case of high torques generated by the internal combustion engine and applied via the coupling flange 16 to the shaft 14 to provide for high bearing tension, thus a high axial force, whereas during low and average torques a reduced bearing tension is provided which has a positive effect on the degree of efficiency of the bearing device 10.

In order to generate such a torque-dependent bearing tensioning, that is, a bracing of the bearing inner ring 36 relative to the bearing outer ring 34 of the conical roller bearing 24, a bracing device 50 is provided, by means of which, due to a relative rotation of the coupling flange 16 with respect to the bearing inner ring 36, this bearing inner ring 36 can be subjected to a force in axial direction of the shaft 14 according to the direction arrow 44 and can thus be braced relative to the bearing outer ring 34, whereby the bearing tensioning can be achieved.

The relative rotation of the coupling flange connected non-rotatably to the shaft 14 with respect to the bearing inner ring 36, which, likewise, is also non-rotatably connected to the shaft 14 takes place in that a region of the shaft 14, to which the torque is applied via the coupling flange 16, is twisted due to elasticities of the shaft 14 relative to a region of the shaft 14 arranged downstream in the direction of the torque flow. This means therefore that the region of the shaft 14, in which the coupling flange 16 is connected to the shaft, rotates with respect to the region in which the bearing ring 36 is connected to the shaft 14 via the sleeve 42, whereby this relative rotation takes place in dependence upon the amount of the torque applied. In case of high torques a high relative rotation thus takes place. In case of low torques a smaller relative rotation or hardly any relative rotation takes place.

The relative rotation about the rotation axis of the shaft 14 results in a movement of the bearing inner ring 36 and generates a force 59 in axial direction of the shaft 14. The bracing device 50 comprises a control part 52 of the coupling flange 16, which is integrally formed with the coupling flange 16 and has a ramp form, and also a corresponding actuating part 54 which is part of the bearing inner ring 36, and also has a ramp form, and which cooperate with respective cylinder rollers 56.

The control part 52 is arranged on an end face of the coupling flange 16 facing the bearing inner ring 36, whereas the actuating part 54 is arranged on an end face of the bearing inner ring 36 assigned to the coupling flange 16. From a view as shown in FIGS. 3A and 3B, it becomes clear that, in case of a relative rotation of the coupling flange 16 and thus of the control part 52 with respect to the bearing inner ring 36 and thus the actuating part 54, the cylinder roller 56 rolls along ramp-shaped flanks of the control part 52 and the actuating part 54 and thus moves the control part 52 and the actuating part 54 away from each other. As the control part 52 is now supported via the coupling flange 16 in axial direction of the shaft 14 and also the bearing inner ring 36 is supported via the conical rollers and the bearing outer ring 34 on a corresponding shoulder 58 of the housing 20 in axial direction of the shaft 14, a force in axial direction of the shaft 14 is generated which results in the desired bracing.

The amount of this bracing and thus the amount of this axial force which results in the bearing tensioning depends on how far the cylinder roller 56 moves along on the corresponding flanks of the ramp-shaped control part 52 or the actuating part 54, which in turn depends on the amount of the relative rotation of the coupling flange 16 with respect to the bearing inner ring 36. This in turn depends on the amount of the torque applied. The higher the torque the higher is the relative movement of the cylinder roller 56 with respect to the ramp-form flanks and the higher is the axial bearing tension. This means that very high bearing tensions result from very high torques. If the torque is reduced the relative rotation between the coupling flange and the bearing inner ring 36 and thus also the bearing tensioning decreases.

The formation of the axial force which is indicated by a direction arrow 59, wherein the relative rotation of the coupling flange 16 with respect to the beating inner ring 36 is indicated by a direction arrow 60, is facilitated in that the axial displacement of the bearing inner ring 36 with respect to the shaft is made possible by the slide bushing 46 described, whereby the force applied to the bearing inner ring 36 can flow at least virtually completely into the bearing tensioning. As mentioned, the toothing 40 also allows this relative displacement of the bearing inner ring 36 with respect to the shaft 14.

Figure 2:
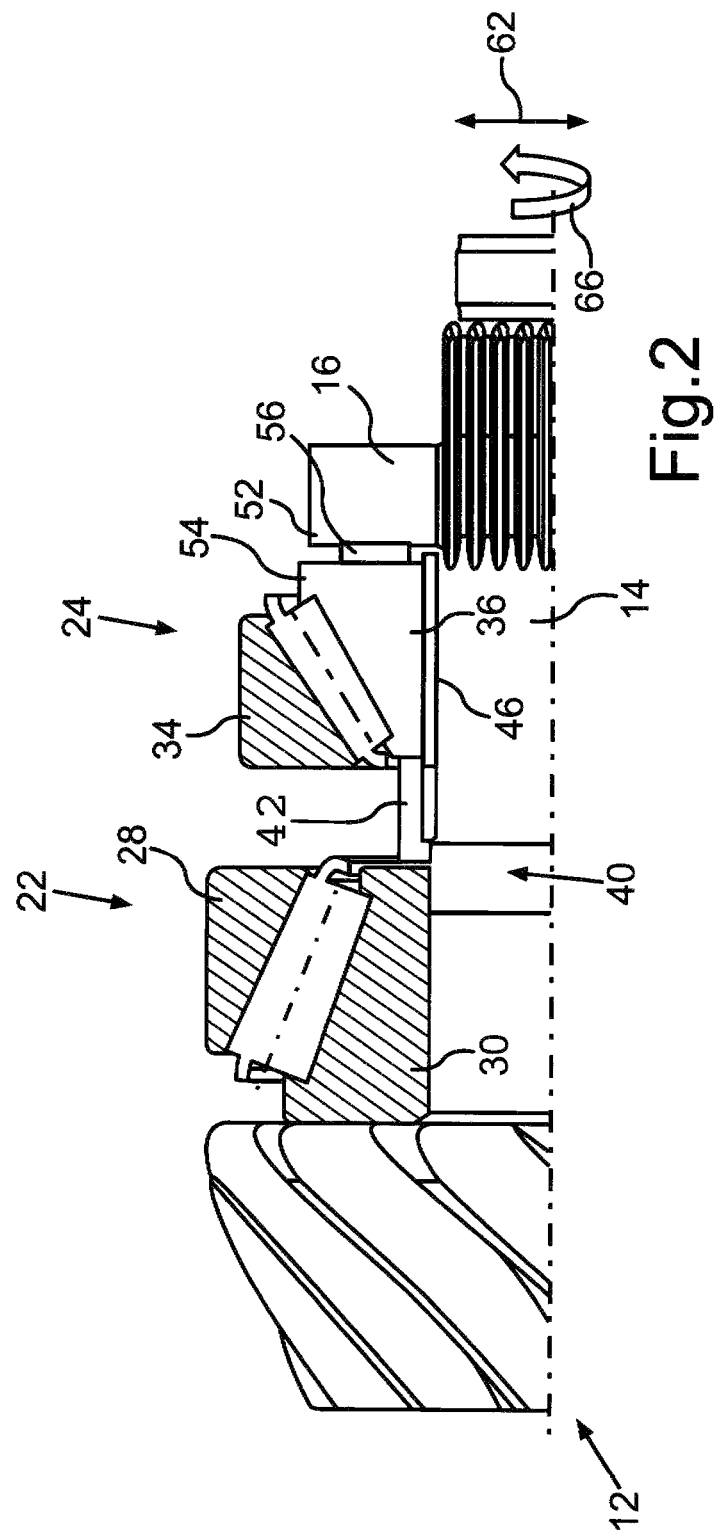
FIG. 2 shows a schematic longitudinal sectional view of the bearing mounting arrangement according to FIG. 1.

FIG. 2 shows this situation again schematically. The cylinder roller 56 extends in the same way as the respective ramp shape of the control part 52 or the actuating part 54 at least substantially parallel to the radial direction of the shaft 14 according to a direction arrow 62. It should be noted at this point that obviously a plurality of cylinder rollers 56 is provided which rollers are held in position by a corresponding cage and are arranged distributed around the peripheral direction of the shaft 14. A corresponding control part 52 or actuating part 54 is thereby assigned to each cylinder roller 56. The increase in the flanks of the respective ramp shape thereby determines the amount of the force in axial direction, thus the bearing tensioning in dependent on the amount of the relative rotation of the coupling flange 16 with respect to the bearing inner ring 36. A direction arrow 66 in FIG. 2 indicates the rotation of the shaft 14 and the application of the torque via the coupling flange 16 to the shaft 14.

What is claimed is:

1. A bearing mounting arrangement (10) for a drive train of a motor vehicle, comprising a shaft (14), a drive part (16) connected to the shaft (14) for rotation therewith, an inner bearing ring (36) axially and rotationally slidably supported on the shaft (14) and an outer bearing ring (34) for supporting the shaft (14), a bracing device (50) arranged between the drive part (16) and the inner bearing ring (36) for biasing the inner bearing ring (36) in an axial direction (44) of the shaft toward the outer bearing ring (34), the inner bearing ring (36) being provided with an axially extending sleeve (42) which is connected to the shaft (14) at a connecting area (40) axially spaced from the drive part (16) so as to provide for a torsion-twist shaft section between the connecting area (40) of the bearing ring (36) to the shaft (14) and the drive part (16) which, when subjected to a torque, causes relative rotation between the drive part (16) and the inner bearing ring (36) resulting in axial displacement with a force which is generated by the bracing device (50) due to a relative rotation of the drive part (16) with respect to the bearing ring (36) and which depends on a torque transmitted by the drive part (16) of the shaft (14).

2. The mounting arrangement (10) according to claim 1, wherein the bracing device (50) comprises a control part (52) assigned to the drive part (16) and having a ramp structure and a corresponding actuating part (54) which is part of the inner bearing ring (36) and has a sidewall structure which cooperates via intermediate roller bodies (56) with the drive part (16) for biasing the inner bearing ring (36) toward the outer bearing ring (34).

3. The mounting arrangement (10) according to claim 2, wherein the intermediate roller bodies (56) are cylinder rollers (56).

4. The mounting arrangement (10) according to claim 2, wherein the control part (52) is arranged on an end face of the drive part (16) facing the inner bearing ring (36).

5. The mounting arrangement (10) according to claim 2, wherein the actuating part (54) is arranged at an end face of the bearing ring (36) facing the drive part (16).

6. The mounting arrangement (10) according to claim 2, wherein the respective ramp structure extends at least substantially parallel to the radial direction (62) of the shaft (14).

7. The mounting arrangement (10) according to claim 1, wherein the inner bearing ring (36) is axially slidably supported on the shaft (14) and is non-rotatably connected thereto.

8. The mounting arrangement (10) according to claim 1, wherein a slide bushing (46) is arranged between the shaft (14) and the inner bearing ring (36).

\* \* \* \* \*